United States Patent [19]

Tennichi

[11] Patent Number: 5,149,204
[45] Date of Patent: Sep. 22, 1992

[54] DUST SEAL DEVICE OF A LINEAR GUIDE APPARATUS

[75] Inventor: Kazuhito Tennichi, Maebashi, Japan

[73] Assignee: Nippon Seiko Kabushiki Kaisha, Tokyo, Japan

[21] Appl. No.: 717,632

[22] Filed: Jun. 19, 1991

[30] Foreign Application Priority Data

Jun. 20, 1990 [JP] Japan .................................. 2-65031

[51] Int. Cl.$^5$ .............................................. F16C 29/06
[52] U.S. Cl. ........................................ 384/15; 384/45
[58] Field of Search ................ 384/15, 45, 43, 44; 464/168

[56] References Cited

U.S. PATENT DOCUMENTS

| | | | |
|---|---|---|---|
| 4,886,376 | 12/1989 | Osawa | 384/15 |
| 4,921,358 | 5/1990 | Kasuga et al. | 384/15 |
| 4,927,272 | 5/1990 | Ward | 384/15 |

FOREIGN PATENT DOCUMENTS 60-103623  7/1985  Japan .

*Primary Examiner*—Lenard A. Footland
*Attorney, Agent, or Firm*—Basile and Hanlon

[57] ABSTRACT

A dust seal device of a linear guide apparatus includes a pair of side seals respectively attached to end cap which are in turn attached to opposite ends of a slider main body. Each side seal has an inverted U-shaped and consists of a mandrel formed of a steel plate coated with a synthetic rubber. The side seal includes side groove seal portions formed at both sides of the inner edge of an opening of the side seal and an upper groove seal portion formed at an upper side of the inner edge. Each end cap includes a recessed groove formed in an inner peripheral edge surface of an opening of the end cap so that the recessed groove extends in a U-shape along the inner peripheral edge. The side seal is inserted into the recessed groove from a lower side of the end cap by pushing upwardly so that the side seal is fitted into the recessed groove.

1 Claim, 5 Drawing Sheets

DUST SEAL DEVICE OF A LINEAR GUIDE APPARATUS

BACKGROUND OF THE INVENTION

1. Field of the Invention

The present invention relates to a dust seal device of a linear guide apparatus used in a machine tool, an industrial machine, and the like, and, in particular, to an improvement in the attaching structure of side seals which are components of the dust seal device.

2. Description of the Prior Art

With reference to FIG. 5, generally, a linear guide apparatus includes an axially extended, long guide rail 1 and a slider 2 having a substantially inverted U-shaped cross section and movably straddling the guide rail 1. The guide rail 1 has ball rolling grooves 3 formed in both side surfaces. A main body 2A of the slider 2 has ball rolling grooves 5 formed in inner surfaces of both side walls 4 so that the ball rolling grooves 5 respectively oppose the ball rolling grooves 3 of the guide rail 1 as shown in FIG. 6. A plurality of balls 6 are loaded in the opposed ball rolling grooves 3 and 5 such that the slider 2 is movable in an axial direction through rolling of the balls 6. With the movement of the slider 2, the balls 6 interposed between the guide rail 1 and the slider 2 are moved while rolling to an end of the slider main body 2A. In order to continuously move the slider 2 in the axial direction, it is necessary to circulate the balls 6. Accordingly, as shown in FIG. 6, a through bore 7 is formed in each of the side walls 4 of the main body 2A as a ball return passage and, at the same time, end caps 2B having a substantially inverted U-shaped cross section are attached to opposite ends of the main body 2A. A pair of U-shaped curved paths 8 are formed in each of the end caps 2B; respectively, to bring the ball rolling grooves 3 and 5 into communication with the ball return passage 7. As a result, an endless ball circulating path is formed by the ball rolling grooves 3 and 5, the curved path 8, and the ball return passage 7.

When foreign matter, such as dust, chips, cuttings, and the like, intrude into a gap between the guide rail 1 and the slider 2 straddling the guide rail 1 and are deposited on the ball rolling grooves and the like, the smooth movement of the balls 6 is disturbed. Accordingly, a side seal 10 is usually attached by small screws n to an outer end surface 2C c of each end cap 2B to prevent the foreign matter from intruding from opposite end portions of the slider 2.

The prior art side seal 10 is shown in FIG. 7. The side seal 10 has an inverted, U-shaped front shape substantially similar to the end cap 2B. A rubber seal portion 12 is formed on an inner edge of an inverted U-shaped opening by molding a nitride rubber onto a steel plate. Furthermore, inserting bores 14 for fixing small screws n are formed about an outer periphery of the rubber seal portion 12 so that the inserting bores 14 are in registration with screw inserting bores 13 formed in the end cap 2B. A grease nipple fixing bore 16 is formed in the side seal 10 in registration with a grease nipple fixing thread bore 15 formed in the end cap 2B. The side seal 10 has guide plates 17 at both sides which are bent backwardly at right angles. The guide plates 17 are respectively applied to step portions 18 formed in side surfaces of the end cap 2B so as to correctly position the side seal 10. Further, in FIG. 5, a grease nipple is shown at RG, and a wire type retainer is shown at H which prevents the balls 6 within the ball rolling groove 5 from falling out when the slider 2 is removed from the guide rail 1.

However, in such a prior art dust seal device, or a dust seal structure of the side seals of a linear guide apparatus, since each of the side seals is secured to the slider main body 2A together with the end cap 2B by commonly using the fixing small screws n, the following problems are encountered:

The mounting work of the side seal 10 to the slider 2 in a factory is a "double work" such that the work efficiency is very low.

Specifically, it is necessary to perform a check for a quality certification item measurement including the frictional resistance of the slider 2 when it travels on a guide rail, and the like, under a condition in which the side seal 10 is not mounted on the linear guide apparatus. For this purpose, as shown in FIGS. 8 and 9, first, only the end caps 2B are fixed to the slider main body 2A by the small screws n. The slider 2 assembled in this manner is mounted on the guide rail 1 and the predetermined check is carried out. Thereafter, all the small screws n are removed. At this time, in order that the end caps 2B are not separated from the slider main body 2A the end caps 2B must be held securely by hand. Then, each of the side seals 10 is superposed on the corresponding end cap 2B while holding the end cap 2B by hand and the end cap 2B and the side seal 10 are secured to the slider main body 2A at the same time by tightening the small screws n. Thus, a very troublesome process is needed.

Since the side seal 10 is rigidly secured to the slider main body 2A together with the end cap 2B, when the slider 2 is elastically displaced due to a load, the surface pressure of the sealing surface of the side seal 10 is excessively increased.

When the slider 2 having the side seals 10 fixed thereto is assembled to the guide rail 1, if a contact condition of the side seals 10 with surfaces of the guide rail 1 is not satisfactory, it is necessary to again tighten the small screws n after adjusting the position of the side seals 10 by releasing the small screws n.

SUMMARY OF THE INVENTION

The present invention was made in view of the problems in the prior art and it is an object of the invention to provide a dust seal structure of a linear guide apparatus which is of a fitting-in type requiring no fixing screws and is simple in attachment, which has a simple structure and is easy to manufacture, and which can automatically maintain a good contact condition with the surfaces of a guide rail.

A dust seal structure of the present invention is used with a linear guide apparatus. The linear guide apparatus includes a guide rail extending lengthwise in an axial direction and having ball rolling grooves formed in both side surfaces, and a slider movably straddling the guide rail. The slider includes a slider main body having ball rolling grooves which are respectively formed in inner surfaces of side walls and respectively oppose the ball rolling grooves of the guide rail. The slider main body further has ball return passages penetrating through thick wall portions of the side walls in parallel with the ball rolling grooves in the inner surfaces of the side walls and end caps respectively joined to opposite ends of the slider main body. Each of the end caps has a pair of curved paths for bringing the ball return passages into communication with the ball rolling grooves. A plurality of balls are rollably inserted into the ball rolling grooves. The dust seal structure includes a pair of side seals for sealing openings at front and rear portions of gaps between the slider and the guide rail. Each of the side seals has an inverted U-shape and is mounted to the end cap by inserting the side seal into a recessed groove formed in an end portion of an opening of the end cap.

As described above, each of the pair of side seals is mounted to the end cap by inserting the side seal upwardly into the recessed groove formed in the end portion of the opening of the end cap from below in a single attaching operation. Since there is no need to remove the end cap fixing small screws as is the case in the prior art, the efficiency of a check operation and assembling work are improved. Furthermore, when the degree of fitting of the side seal into the recessed groove is made loose, the seal lips of the side seal will be easily and flexibly adapted to the rolling member rolling grooves of the guide rail so that the sealing of the grooves can be smoothly made. On the other hand, when the fitting is made tight, the side seal will be securely held and a so-called labyrinth seal is obtained with a minute gap retained between the seal lips and the surfaces of the guide rail.

DESCRIPTION OF THE PREFERRED EMBODIMENT

Figure 1:
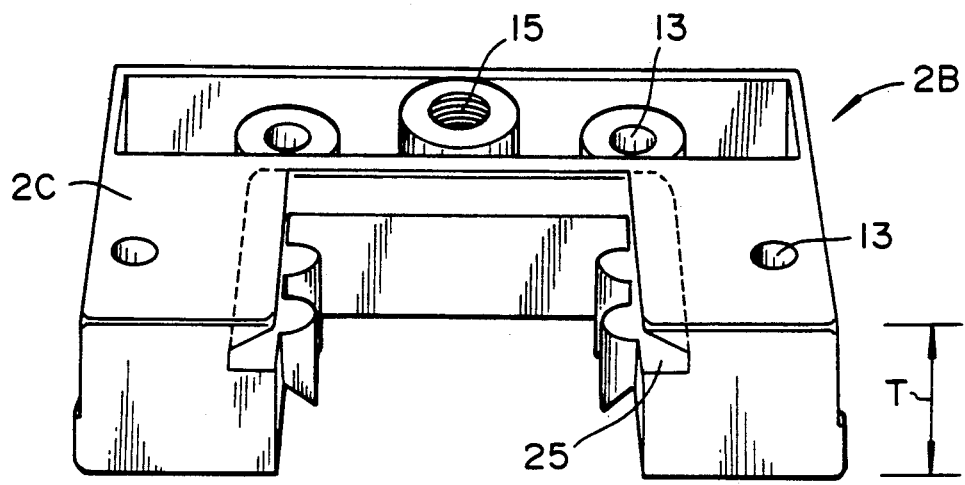
FIG. 1 is a disassembled perspective view of an end cap with a dust seal device of an embodiment of the present invention as viewed from the under side of the end cap.
Figure 2:
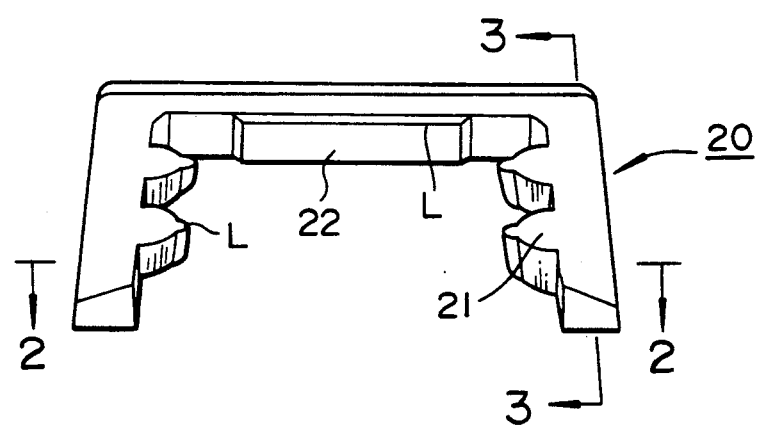
FIG. 2 is a cross sectional view generally taken along the line 2—2 in FIG. 1.
Figure 3:
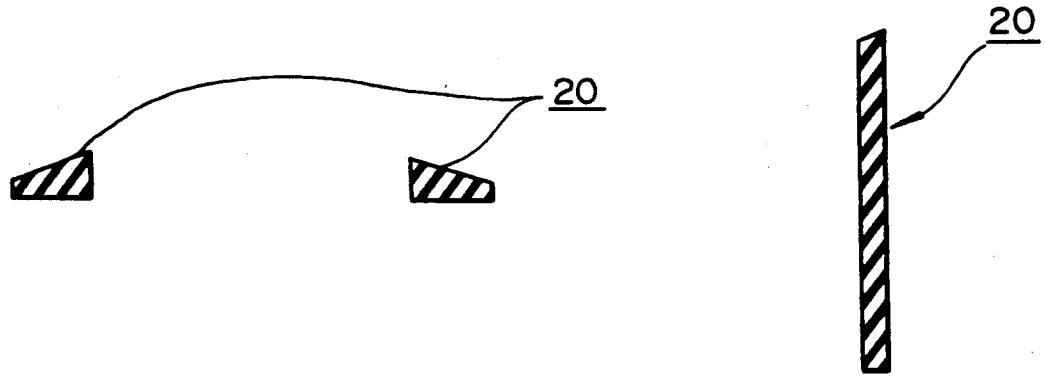
FIG. 3 is a cross sectional view generally taken along the line 3—3 in FIG. 1.
Figure 5:
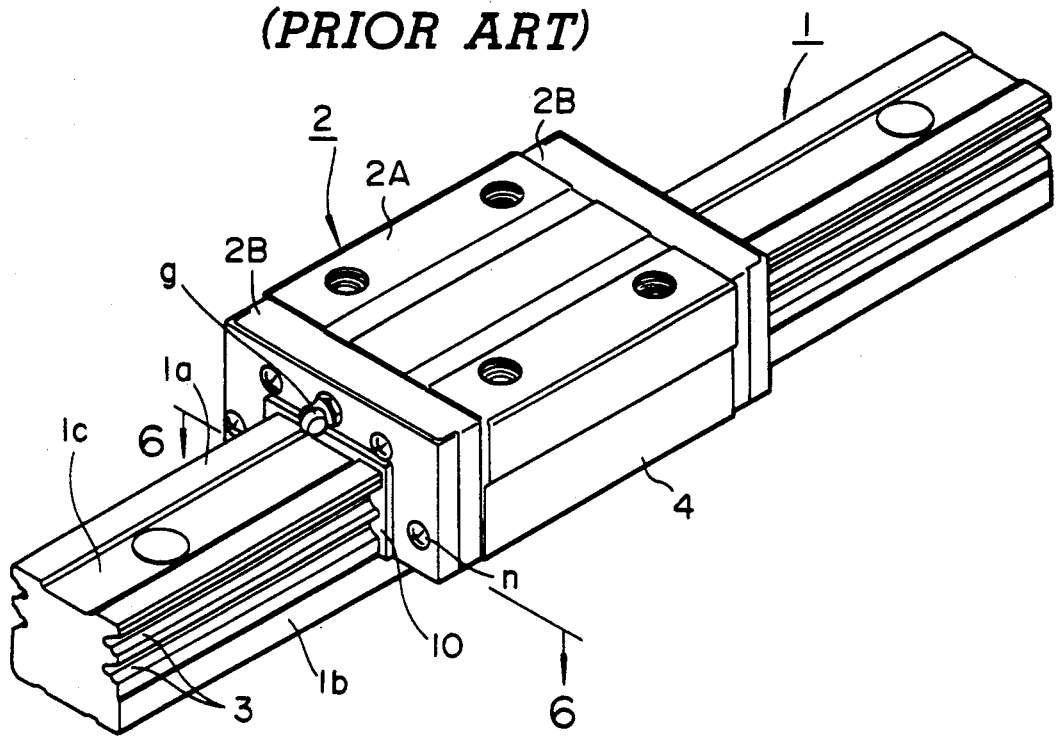
FIG. 5 is a perspective view of a prior art linear guide apparatus.
Figure 6:
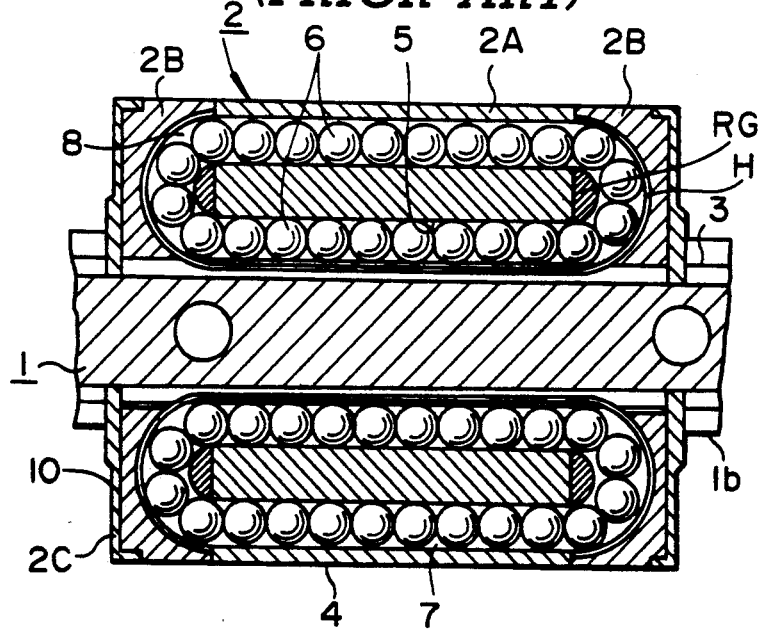
FIG. 6 is a cross sectional view generally taken along the line 6—6 in FIG. 5.
Figure 7:
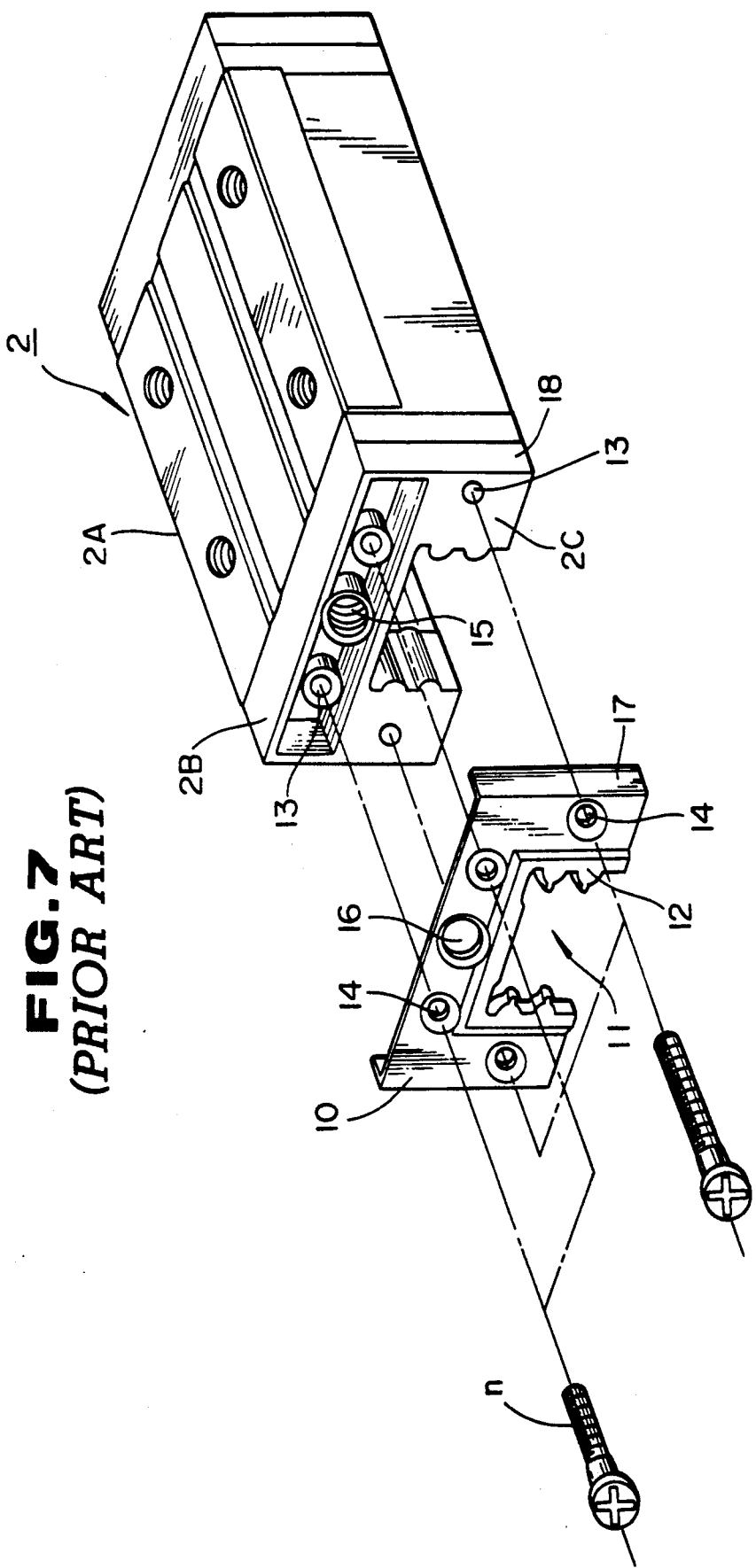
FIGS. 7, 8 and 9 are perspective views for explaining a mounting operation of a prior art side seal.
Figure 8:
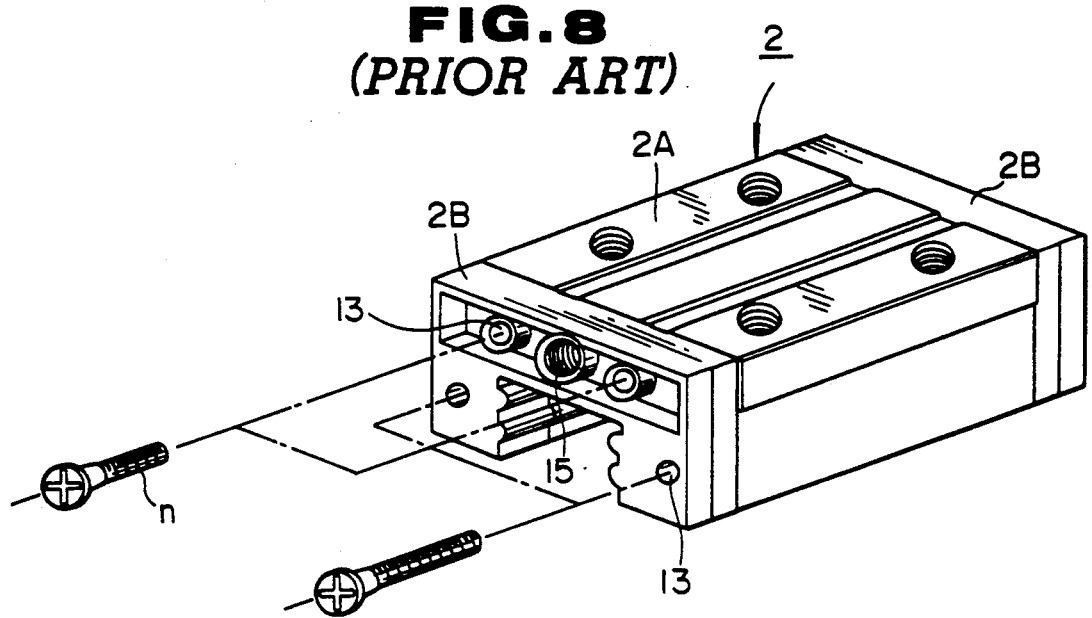
Figure 9:
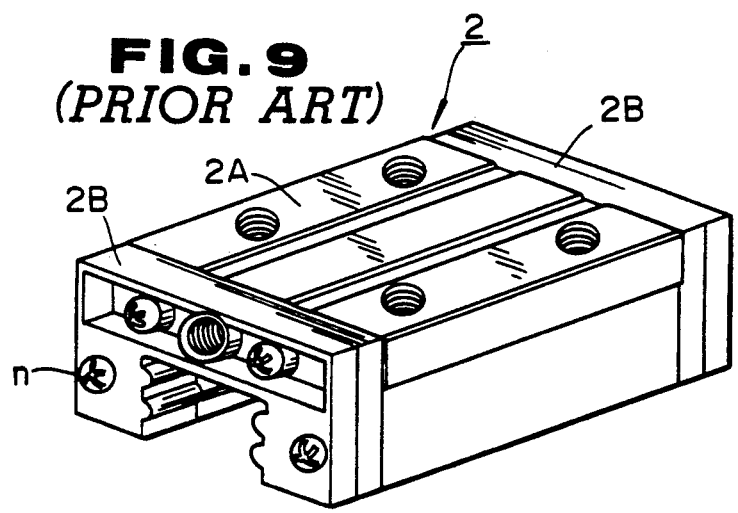

An embodiment of the invention will be described with reference to the drawings in which like or equivalent parts to that in the prior art are designated with like numerals throughout the drawings. FIG. 1 shows an embodiment of the invention and is a view from the under side of an end cap 2B and a side seal 20. A linear guide apparatus includes a pair of end caps 2B and a pair of side seals 20. The side seal 20 includes a mandrel (not shown) made of a steel plate having an inverted U-shape and wrapped with an outer coating (not shown) made of a synthetic rubber and welded to the mandrel. The side seal 20 has a side groove seal portion 21 on each side of an inverted U-shaped inner edge of the side seal 20 so that the side groove seal portion 21 protrudes inwardly and has a shape corresponding to the shape of ball rolling grooves 3 of a guide rail 1. Furthermore, an upper surface groove seal portion 22 is protrudingly formed on an upper side of the inverted U-shaped inner edge of the side seal 20 so that the upper surface groove seal portion 22 has a shape corresponding to the shape of a recessed surface 1c formed in an upper surface 1a of the guide rail 1, see FIG. 5. Seal lips L are respectively formed at extreme ends of the side groove seal portion 21 and the upper surface groove seal portion 22. The cross section of the side seal 20 is substantially of a trapezoidal shape, as shown in FIGS. 2 and 3. An inner peripheral edge of the side seal 20 has a thick wall and an outer peripheral edge has a thin wall.

On the other hand, each end cap 2B is an injection mold product made of a synthetic resin, or a die casting product made of stainless steel or aluminum. The wall thickness T of the end cap 2B is larger than that of a prior art end cap by the thickness of the side seal 20. The end cap 2B has a recessed groove 25 extending in a U-shape in an inner edge surface along an opening at an outer end surface 2c side. The recessed groove 25 has a cross section and a shape matched with the cross section and the shape of the side seal 20.

Figure 4:
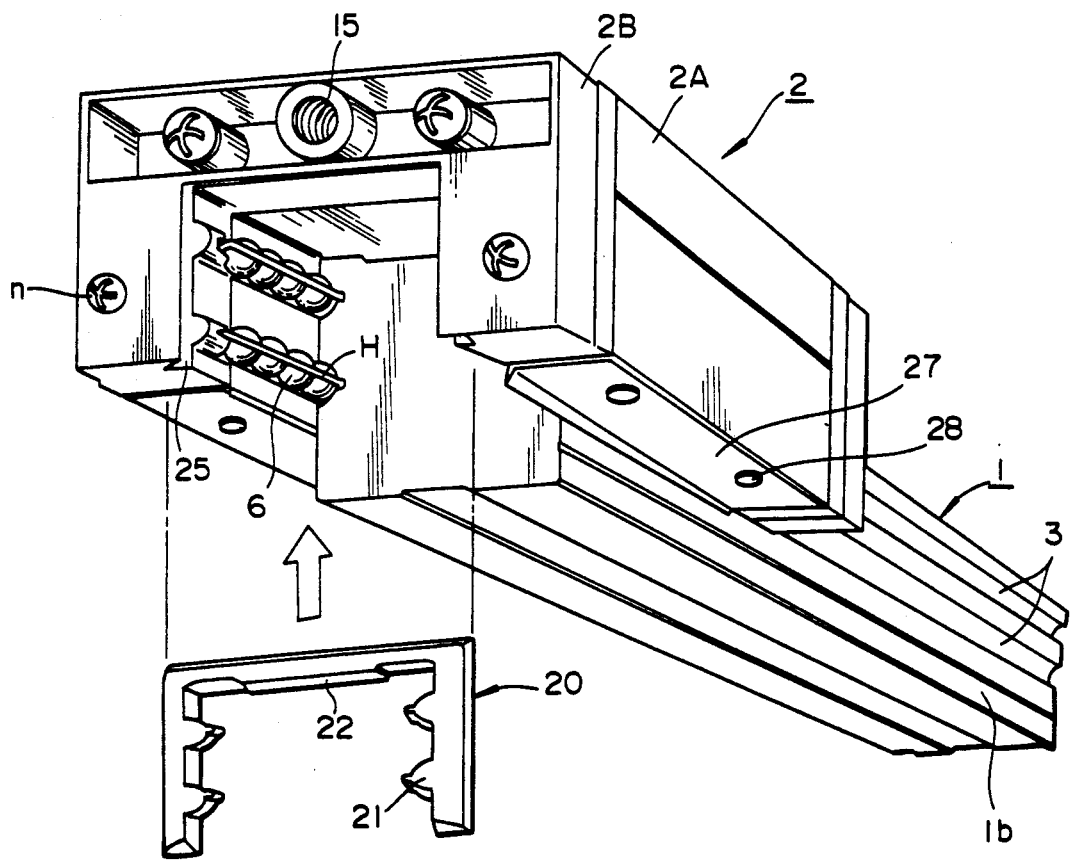
FIG. 4 is a perspective view for explaining a mounting process of the side seal of FIG. 1.

The mounting of each side seal 20 can be performed as shown in FIG. 4 with the slider 2 being assembled to the guide rail 1. In this respect, FIG. 4 is a view in the direction of the arrow from a lower side of the guide rail 1 having the slider 2 assembled thereto. Further, each under seal 27 is shown fixed to a lower end surface of a slider main body 2A formed by rivets 28.

Specifically, the slider 2 having the end caps 2B attached to the slider main body 2A is made to slide to an end of the guide rail 1 and the end cap 2B is made to protrude outwardly from the end of the guide rail 1. In this case, the balls 6 are held by a retainer H and do not fall off the slider 2. Then, it is only required to insert the side seal 20 into the U-shaped recessed groove 25 of the end cap 2B from below.

When the slider 2 having the side seal 20 mounted to the end cap 2B in a single mounting operation is returned to a normal position on the guide rail 1, an upper side portion of the side seal 20 is sandwiched between the end cap 2B and the upper surface 1a of the guide rail 1. As a result, fall-off of the side seal 20 is prevented.

If the degree of fitting of the side seal 20 into the U-shaped recessed groove 25 of the end cap 2B is set somewhat loosely beforehand, the seal lips L are easily and flexibly adapted to the surfaces of the guide rail 1 to be sealed, including the ball rolling grooves 3. Accordingly, even when there is a small dimensional error, such an error will be absorbed and the sealing will be achieved smoothly. In this case, the seal lips L at an end surface of the inner peripheral side of the side seal 20 are lightly and slidably in contact with the upper surface 1c and the side surfaces 1b of the guide rail 1, and the surfaces of the guide rail 1 are wiped as the slider 2 travels therealong.

On the other hand, if the degree of fitting of the side seal 20 into the U-shaped recessed groove 25 of the end cap 2B is set somewhat tightly beforehand, the side seal 20 is held and secured by the end cap 2B. Accordingly, if the size of the inner edge of the side seal 20 is made a little larger in advance, it is possible to form a so-called labyrinth seal with a minute gap retained between the seal lips L and the surfaces of the guide rail 1 to be sealed. In this case, it is not intended to wipe out very minute dust, but only the intrusion of large foreign matter which affect the rolling movement of the balls 6 is prevented. Since the side seal 20 seldom wears, advantages are provided in which the life of the side seal 20 can be extended and the sliding resistance of the side seal 20 can be reduced.

Furthermore, in the embodiment described above, although the present invention is applied to a linear guide apparatus having the ball rolling grooves 5 formed in two rows in each side of the guide rail 1

(slider 2), the present invention is also applicable to other types of linear guide apparatuses.

In the above embodiment, although the recessed groove 25 formed in the end cap 2B for mounting the side seal 20 is formed in a U-shape, the recessed groove 25 may be formed only in both inner side surfaces and an upper portion of the recessed groove 25 may be omitted so that the upper portion may be formed flat.

As described in the foregoing, in the present invention, each of a pair of side seals used with the linear guide apparatus is mounted to the end cap by inserting the side seal into a recessed groove formed in an inner edge of an opening of the end cap. As a result, the following advantages are provided:

There is no need to tighten or remove the small screws from the end cap, even when the check of a quality certification item measurement of a linear guide apparatus product is to be performed. Thus, the working efficiency is remarkably improved as compared with the prior art.

The shape of the side seal is simple and the manufacturing cost can be reduced.

When the degree of fitting of the side seal into the recessed groove is made loose, the seal surface pressure of the side seal does not vary or increase excessively even when the slider is elastically displaced due to a load.

When the slider is assembled on the guide rail, the side seal is naturally adapted to the surfaces of the guide rail and the seal lips of the side seal satisfactorily contact the surfaces of the guide rail to be sealed. Accordingly no complicated processes are necessary to adjust the position of the side seal by loosening the small screws and again re-tighten the small screws.

What is claimed is:

1. A dust seal device of a linear guide apparatus wherein the linear guide apparatus is formed of an axially extending guide rail having ball rolling grooves respectively formed in both side surfaces and a slider movably straddling the guide rail, the slider including a slider main body having ball rolling grooves respectively opposing the ball rolling grooves of the guide rail and formed in inner surfaces of side walls thereof, the slider main body further having through bores as ball return passages formed respectively in the side walls in parallel to the ball rolling grooves of the slider main body, a pair of end caps respectively joined to opposite ends of the slider main body, each of the end caps having a pair of curved paths respectively for bringing a corresponding one of the ball return passages into communication with a corresponding one of the ball rolling grooves, and a plurality of balls rollably inserted into the opposing ball rolling grooves, the dust seal device comprising:

a pair of side seals for respectively sealing front and rear openings of gaps between the slider and the guide rail, each of the side seals having an inverted U-shape and mounted to one of the end caps by inserting each side seal into a recessed groove formed in an end portion of an opening of each end cap.

* * * * *